United States Patent
Rode

(10) Patent No.: US 6,244,751 B1
(45) Date of Patent: Jun. 12, 2001

(54) ADJUSTABLE SPACER HAVING A GENERALLY AXIALLY CURVED BEARING INTERFACE PORTION

(75) Inventor: John E. Rode, Fonda, NY (US)

(73) Assignee: Temper Corporation, Fonda, NY (US)

( * ) Notice: Subject to any disclaimer, the term of this patent is extended or adjusted under 35 U.S.C. 154(b) by 0 days.

(21) Appl. No.: 09/259,067

(22) Filed: Feb. 26, 1999

(51) Int. Cl.[7] .................... F16C 33/374; F16C 35/12
(52) U.S. Cl. ................ 384/551; 384/517; 384/519; 384/563; 384/583; 29/898.06
(58) Field of Search ..................... 384/551, 517, 384/519, 563, 583, 626; 267/161; 411/544, 546; 29/898.06, 898.09, 446

(56) References Cited

U.S. PATENT DOCUMENTS

| | | | |
|---|---|---|---|
| 3,900,232 | * | 8/1975 | Rode ................... 384/517 |
| 4,067,585 | * | 1/1978 | Rode ................... 277/200 |
| 4,172,621 | * | 10/1979 | Yoshida ................ 384/563 |
| 4,611,935 | * | 9/1986 | Rode ................... 384/548 |
| 5,549,397 | * | 8/1996 | Rode ................... 384/551 |
| 5,826,987 | * | 10/1998 | Beaman ................ 384/517 |

FOREIGN PATENT DOCUMENTS 41 08 827 A1 * 9/1992 (DE) ..................... 384/517

* cited by examiner

Primary Examiner—Richard M. Lorence
(74) Attorney, Agent, or Firm—Heslin & Rothenberg, P.C.

(57) ABSTRACT

A bearing assembly adjustable spacer may include an end portion, a deformable portion, a transversely inward face portion, and a transversely outward face portion. The end portion may be configured for generally axial abutment (e.g., with a shoulder portion) at a location about a spindle portion. The deformable portion may allow the spacer to be provided with a desired adjustment (e.g., a preload, an adjustment to an axial dimension of the spacer, and/or a compression of the deformable portion of the spacer). The inward face portion may be generally directed radially relative to an axis of the spacer. Further, the inward face portion may be configured for generally radial abutment (e.g., with a surface portion) at a location about a spindle portion. The outward face portion may have a generally axially curved portion. The curved portion may be largely directed obliquely away from the end portion of the spacer. Also, the curved portion may be configured to interface with a generally axially curved part (e.g., a race) of a bearing portion. The bearing portion may rotatably support a housing portion about the spindle portion.

33 Claims, 2 Drawing Sheets

ADJUSTABLE SPACER HAVING A GENERALLY AXIALLY CURVED BEARING INTERFACE PORTION

TECHNICAL FIELD

This invention relates, generally, to spindle mounted bearings and, more particularly, to an adjustable spacer placed between such bearings mounted on a spindle, axle, shaft, or the like.

BACKGROUND ART

Anti-friction bearings may serve to decrease friction between, for example, a stator and a rotor. For instance, such bearings may allow relative rotation between a housing and a spindle extending through the housing. The housing may comprise, for example, a hub. The spindle may comprise a shaft, axle, or the like. The bearings may comprise roller bearings, for example, tapered roller bearings. In one example, the tapered roller bearings may be employed in wheel hub and axle assemblies. In another example, the tapered roller bearings may be employed in devices such as motors, pumps, or speed reducers.

A typical tapered roller bearing includes a cone having an inner race for mounting on a spindle, a cup having an outer race for mounting in a housing, and a plurality of roller elements within a roller cage positioned between the inner and outer races. Commonly, a pair of such tapered roller bearings may be mounted on a spindle rotation relative to or within a housing. Cooperating bearings, such as a pair of tapered roller bearings, may be included in a bearing assembly, for instance, of a motor, pump, speed reducer, or transmission assembly.

In order to properly secure bearings for operation, it is usually necessary to retain the bearings tightly under a predetermined axial tolerance or load on the spindle, for example, so that the bearings can maintain a proper running clearance of the roller elements under the influence of the combined axial and radial forces which the bearings are designed to support. Manufacturers of such assemblies often carefully measure the space between the bearing inner races, and provide a spacer of precisely the correct dimension and load requirements to fit therebetween. The spacer is typically made of ground steel tubing to a length tolerance of plus or minus one half of one thousandths of an inch. If the bearings are not maintained at a proper tolerance and/or load the bearings may not roll properly or may prematurely wear, particularly if the bearings are maintained at too high of a load, or may, if maintained under too low of a load, have excessive play causing failure of the bearings.

An exemplary configuration for an adjustable spacer is disclosed in U.S. Pat. No. 5,549,397 to John E. Rode (entitled "Adapter Sleeve and an Adjustable Spacer with Radial Extension Useable Thereon," issued Aug. 27, 1996, and assigned to Temper Corporation), which is hereby incorporated herein by reference in its entirety. In one embodiment, such an adjustable spacer may be of a type shaped as a ring for mounting between a pair of tapered bearings mounted on an axle or spindle to allow a load to be axially placed on the bearings. The adjustable spacer may include an extension located at a radius from an imaginary axis of the spacer, a contact means oriented radially outward from the extension, and a compressible area located between the contact means and the extension wherein the compressible area deforms when a predetermined load is applied to the ring in the axial direction. The adjustable spacer may be configured to be used with an adapter sleeve for use on axles or spindles of multiple radii.

However, it remains desirable to provide refinements to such an adjustable spacer, for example, to allow additional or alternative positions of the adjustable spacer on the spindle and/or relative to one or more of the bearings, and/or to provide further configurations for support and/or loading in a bearing assembly.

Thus, a need exists for a configuration for an adjustable spacer to accommodate positioning of bearings for enhanced ease, effectiveness, and/or efficiency of assembly of, and/or enhanced structural support provided by, a bearing assembly of which the adjustable spacer is a part. A need also exists for the adjustable spacer to allow additional and/or further support and/or loading configurations in the bearing assembly. Another need exists for the adjustable spacer to allow a desired adjustment to be provided for the bearing assembly.

SUMMARY OF THE INVENTION

Pursuant to the present invention, shortcomings of the existing art are overcome and additional advantages are provided through the provision of an adjustable spacer having a generally axially curved bearing interface portion.

In one aspect of the invention, a bearing assembly adjustable spacer includes a first section and a second section. The first section includes an end portion and a deformable portion. The deformable portion allows the spacer to be provided with a desired adjustment. The second section includes a transversely inward face portion and transversely outward face portion. The inward face portion is generally directed radially relative to an axis of the spacer. The outward face portion has a generally axially curved portion. The curved portion is largely directed obliquely away from the first section of the spacer. Also, the curved portion is configured to interface with a generally axially curved part of a bearing.

The curved portion of the spacer can include a concave portion. The end portion, the deformable portion, and the curved portion can form an exterior portion of the spacer. The exterior portion of the spacer can comprise a substantially continuous and generally axial curve. The curve can include a concave portion and a convex portion.

The deformable portion of the spacer can form an exterior portion of the spacer. This exterior portion of the spacer can be convex. The end portion of the spacer can be located a first distance from the axis of the spacer. The inward face portion of the spacer can be located a second distance from the axis of the spacer. The second distance can be different from the first distance. Also, the second distance can be less than the first distance.

The end portion of the spacer can include a terminal face portion directed generally axially away from the second section of the spacer. The inward face portion of the spacer can resemble an arc. The curved portion of the spacer can be curved generally radially. The desired adjustment of the spacer can include a preload, an adjustment to an axial dimension of the spacer, and/or a compression of the deformable portion of the spacer.

In another aspect, a bearing assembly adjustable spacer includes a first end portion, a second end portion, and a medial portion. The first end portion is configured for generally axial abutment at a first location about a spindle portion. The second end portion is configured for generally radial abutment at a second location about a spindle portion. The medial portion is located between the first end portion and the second end portion. Further, the medial portion includes a deformable portion and a generally axially curved portion. The deformable portion allows the spacer to be provided with a desired adjustment. The curved portion is configured to interface with generally axially curved part of a bearing.

The curved portion of the spacer can include a transversely outward face portion. The outward face portion can include a concave portion. In addition, the outward face portion can be largely directed away from the first end portion of the spacer.

The first end portion, the deformable portion, and the curved portion can form an exterior portion of the spacer. The exterior portion of the spacer can comprise a substantially continuous and generally axial curve. The curve can include a concave portion and a convex portion.

The deformable portion of the spacer can include a transversely outward face portion. This outward face portion can be convex. Further, the medial portion of the spacer can include a transversely inward face portion. This inward face portion can be concave.

The first end portion of the spacer can be located a first distance from an axis of the spacer. The second end portion of the spacer can be located a second distance from the axis of the spacer. The second distance can be different from the first distance. In addition, the second distance can be less than the first distance. The desired adjustment of the spacer can include a preload, an adjustment to an axial dimension of the spacer, and/or a compression of the deformable portion of the spacer.

The invention also contemplates a method for configuring a bearing assembly adjustable spacer. A face portion of the spacer is curved generally axially to interface with a generally axially curved part of a bearing. A deformable portion of the spacer is formed to allow the spacer to be provided with a desired adjustment.

In yet another aspect, an adjustable bearing assembly includes a shoulder portion of a spindle, a bearing portion, and an adjustable spacer. The bearing portion is located about the spindle. Also, the bearing portion includes a generally axially curved part. The adjustable spacer is located about the spindle. In addition, the adjustable spacer is located between the shoulder portion of the spindle and the curved part of the bearing portion. Further, the adjustable spacer includes an end portion, a generally axially curved portion, and a deformable portion. The end portion of the adjustable spacer interfaces with the shoulder portion of the spindle. The curved portion of the adjustable spacer interfaces with the curved part of the bearing portion. The deformable portion of the adjustable spacer allows the spacer to be provided with a desired adjustment.

The curved portion of the adjustable spacer can radially and/or axially support the curved part of the bearing portion. The end portion of the adjustable spacer can generally axially abut the shoulder portion of the spindle.

The end portion of the spacer can comprise a first end portion. The adjustable spacer can include a second end portion interfacing with a surface portion of the spindle. The curved portion of the adjustable spacer can be located between the first end portion of the spacer and the second end portion of the spacer. The second end portion of the adjustable spacer can generally radially abut the surface portion of the spindle. The first end portion of the spacer can be located a first distance from an axis of the adjustable spacer. The second end portion of the spacer can be located a second distance from the axis. The second distance can be different from the first distance. In addition, the second distance can be less than the first distance.

The bearing portion can comprise a race of a roller bearing. Also, the bearing portion can rotatably support a housing portion located about the spindle. A retainer portion can be located between the bearing portion and the housing portion. Further, the bearing portion can comprise a first bearing portion. A second bearing portion can be located between the shoulder portion of the spindle and the housing portion. The shoulder portion can comprise a first shoulder portion of the spindle. A second shoulder portion of the spindle can be located between the first shoulder portion and the housing portion. The second bearing portion can interface with the second shoulder portion of the spindle.

The desired adjustment of the adjustable spacer can include a preload, an adjustment to an axial dimension of the spacer, and/or a compression of the deformable portion of the spacer.

Thus, the present invention advantageously provides an adjustable spacer that improves assembly, adjustment ease, accuracy, efficiency, support performance, and/or effectiveness of the adjustable spacer. The adjustable spacer further accommodates, fits, engages, matches, and/or meets a curved part of a bearing. Also, the invention allows the adjustable spacer to interface with a curved part of a bearing, a surface portion of a spindle, and/or a shoulder portion of a spindle. In addition, the present invention improves structural support and/or loading provided and/or transferred by the adjustable spacer in a bearing assembly, on a spindle, and/or in a housing.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, an adjustable spacer having a generally axially curved bearing interface portion is provided.

Figure 1:
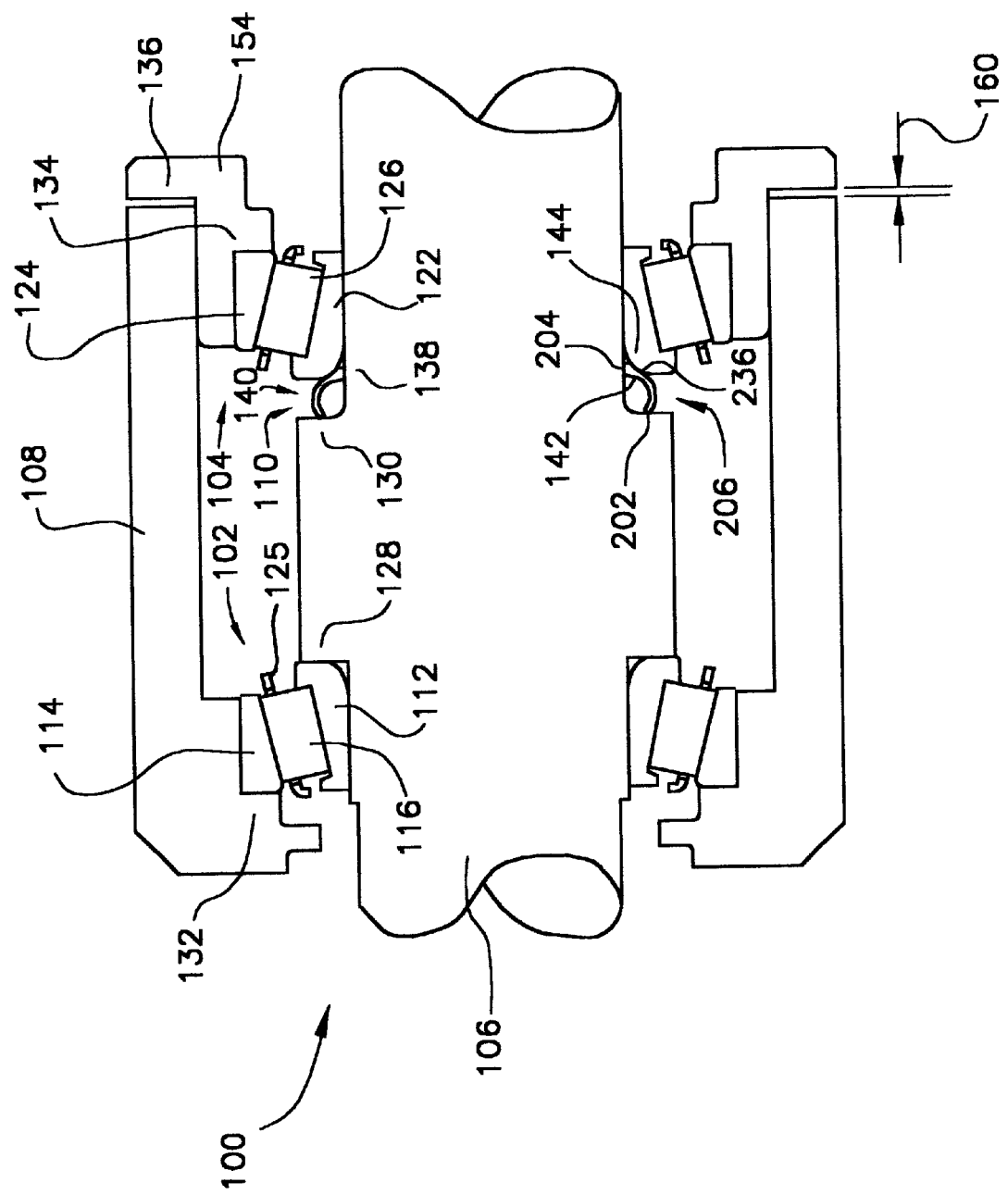
FIG. 1 is a cutaway, sectional, partial, side view of one example of an adjustable spacer in a bearing assembly located between a spindle and a housing, illustrating a generally axially curved portion of the spacer interfacing with a curved part of a bearing.

Referring to FIG. 1, bearing assembly 100 may include first bearing 102 and second bearing 104. The bearings may be mounted on spindle 106. The spindle may comprise, for example, a central member (e.g., an axle, a shaft, and/or the like) that may rotate within a bearing portion. For instance, the spindle may comprise a pump, motor, or speed reducer shaft. In one example, the bearings may include a pair of identical but opposed tapered roller bearings. In addition, one or more of the bearings may comprise an unsealed or a sealed bearing, as will be understood by those skilled in the art.

Still referring to FIG. 1, bearings 102 and 104 may support a housing 108. The housing may comprise, for example, a hub such as for supporting a part of a wheel or tire (not shown). Adjustable spacer 110 may be located axially between the bearings, and radially between spindle 106 and the housing 108. The adjustable spacer may include deformable portion 140 and a curved portion such as generally axially curved portion 142. An illustrative description of the curved portion of the spacer is presented herein.

Further referring to FIG. 1, deformable portion 140 of adjustable spacer 110 may serve to allow adjustment to, for instance, axial length of the adjustable spacer, and/or any number of other characteristics and/or behaviors of the adjustable spacer. For example, adjustment to the deformable portion of the adjustable spacer may allow preloading of bearing assembly 100. Preloading of the adjustable spacer may serve to provide a proper axial loading on the bearing assembly, including the adjustable spacer. Proper axial loading may serve to allow bearing 102 and/or bearing 104 to obtain optimal performance and/or maximal life, with substantial elimination of play in the bearings. In one example, the desired adjustment to the adjustable spacer may include an adjustment to an axial dimension of the spacer and/or a compression of the deformable portion 140 of the adjustable spacer. The spacer may be adjusted in a partially or fully assembled bearing assembly 100, for example, of a pump, motor, or transmission. Additional description of the adjustable spacer is presented further below.

Again referring to FIG. 1, bearing 102 may comprise a tapered roller bearing that may include inner race 112 mounted on spindle 106, outer race 114 mounted in housing 108, and roller elements 116 positioned between the inner race 112 and the outer race 114. Bearing 104 may comprise a tapered roller bearing that may include inner race 122 mounted on the spindle, outer race 124 mounted in retainer 154 engaged with the housing, and roller elements 126 positioned between the inner race 122 and the outer race 124. In one example, the retainer 154 may be considered to comprise a part of the housing 108. The bearing 102 and/or the bearing 104 may employ a roller cage 125 in order to hold the corresponding roller elements 116, 126 in proper position between the corresponding inner and outer races.

Referring further to FIG. 1, axial as well as radial support may be provided among various components of bearing assembly 100. For instance, retainer 154 may provide axial support for outer race 124 of bearing 104, while also providing radial support thereto, such as for positioning thereof. Spindle 106 and inner race 122 of the bearing 104, for example, may have surfaces which abut axially and radially. Similarly, inner race 112 of bearing 102 and the spindle may have surfaces which abut axially as well as radially. Furthermore, housing 108 may be formed to abut outer race 114 of the bearing 102 along axial as well as radial surfaces. The retainer and the housing may also include surfaces for axial and radial support therebetween. Such formation and/or positioning may allow alignment, support, and/or force transfer along a selected number of paths and/or with a selected number of interfaces, as will be appreciated by those skilled in the art.

In one example, additionally referring to FIG. 1, spindle 106 may include shoulder 128 for receiving inner race 112 of bearing 102. The spindle may also include shoulder 130 for abutment with adjustable spacer 110, which may further abut inner race 122 of bearing 104, as described herein. Housing 108 may include shoulder 132 for receiving outer race 114 of the bearing 102. Retainer 154 may include shoulder 134 for receiving outer race 124 of the bearing 104. The retainer may also include stop 136, such as for impeding and/or limiting a certain and/or degree of advancement of axial compression of a portion of the bearing assembly 100 between the housing 108 and the spindle 106. A description of an exemplary use of the stop 136 is presented further below.

Referring again to FIG. 1, in a still further example, housing 108 may be mounted about outer races 114 and 124 for rotation of the housing about spindle 106, with roller elements 116 positioned between the outer race 114 and inner race 112, roller elements 126 positioned between the outer race 124 and inner race 122, and the inner races mounted on the spindle. In another example, the spindle may rotate within the housing. That is, the spindle and/or the housing may serve as, and/or resemble, a stator and/or a rotor, as will be appreciated by those skilled in the art. For illustrative purposes, the description herein emphasizes applications of the invention suitable for devices such as motors, pumps, and/or speed reducers.

Figure 2:
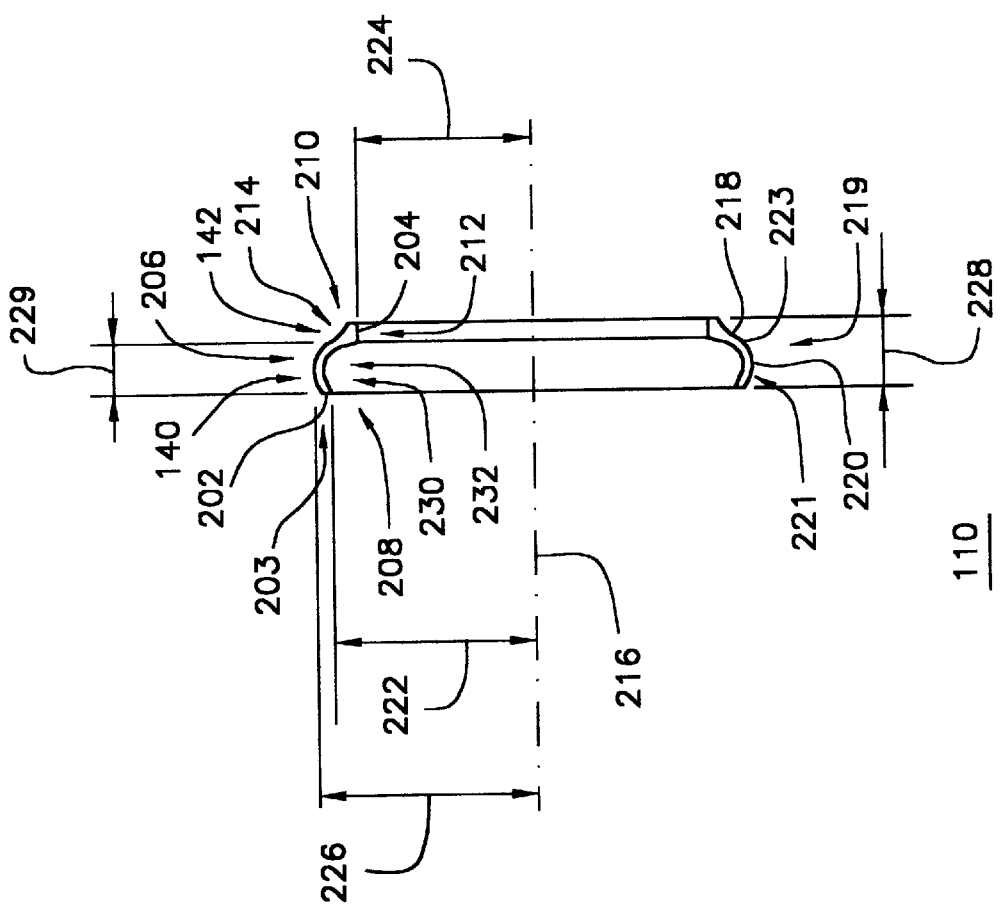
FIG. 2 is a sectional, side view of the adjustable spacer of FIG. 1, illustrating an exemplary axis of the spacer.

Referring now to FIGS. 1–2, first end 202 of adjustable spacer 110 may be configured for generally axially abutment at a first location about a portion of spindle 106. For instance, the first end 202 may be configured to generally axially abut shoulder 130 of the spindle. The first end 202 of the adjustable spacer may include, for example, a terminal face portion 203. The terminal face portion 203 may be directed generally axially away from a second end 204 of the adjustable spacer 110. The second end 204 of the adjustable spacer may be configured for generally radial abutment at a second location about a portion of the spindle. In one example, the second end portion 204 may be configured to generally radially abut surface 138 of the spindle. The surface 138 may comprise, for instance, a portion of an exterior of the spindle.

Still referring to FIGS. 1–2, adjustable spacer 110 may include medial portion 206 located between first end 202 and second end 204 of the spacer. The medial portion of the spacer may include deformable portion 140 and generally axially curved portion 142. The curved portion 142 of the adjustable spacer 110 may advantageously interface with a curved part 144 of inner race 122 of bearing 104. In addition, the generally axially curved portion 142 may be further curved generally radially. For example, the curved portion 142 may fit an extent and/or expanse of the curved part 144 to distribute force and/or pressure between the curved portion 142 of the adjustable spacer and the curved part 144 of the inner race 122, as described herein.

Again referring to FIG. 2, in a further example, adjustable spacer 110 may include a first section 208 and a second section 210. The first section 208 may include first end 202 and deformable portion 140. The second section 210 may include curved portion 142 and second end 204. For instance, the second section 210 may include transversely inward face portion 212 and transversely outward face portion 214. The transversely inward face portion 212 of the second section 210 may be generally directed radially relative to an axis, such as exemplary axis 216, of the adjustable spacer 110. The transversely inward face portion 212 may include the second end 204 of the adjustable spacer. Further, the transversely outward face portion 214 may include curved portion 142. In addition, the curved portion may be largely directed away from the first section 208 of the adjustable spacer. Also, the curved portion may be directed obliquely away from the first section 208 and/or relative to the axis 216 of the adjustable spacer.

Referring to FIG. 2, curved portion 142 of adjustable spacer 110 may comprise a concave portion 218 of transversely outward face portion 214 of second section 210. Further, the deformable portion 140 may form a convex portion 220 of an exterior portion 219 of first section 208, medial portion 206, and/or second section 210 of the adjustable spacer. In one example, first end 202, the deformable portion 140, and the curved portion 142 may form the exterior portion 219 of the adjustable spacer, with the exterior portion 219 comprising a substantially continuous and/or generally axial curve 221, which may include the convex portion 220 and/or the concave portion 218. In addition, the medial portion 206 of the adjustable spacer 110 may include transversely inward face portion 230. For instance, the transversely inward face portion 230 may include concave portion 232.

Figure 3:
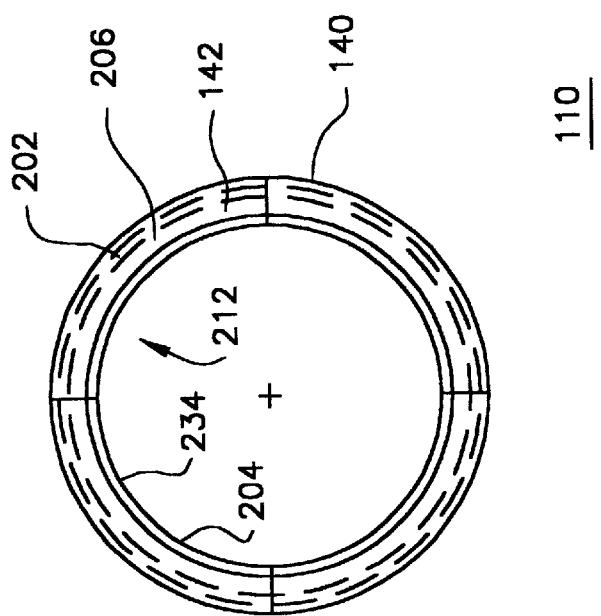
FIG. 3 is an end view of the adjustable spacer of FIG. 1.

Now referring to FIGS. 2–3, transversely inward face portion 212 may resemble and/or comprise an arc 234. For instance, second end 204 of adjustable spacer 110 may comprise the arc 234, such as for radially resting on and/or interfacing, fitting, and/or engaging with surface 138 of spindle 106. In one example, the arc 234 may converge toward a location along axis 216 of the adjustable spacer. The adjustable spacer may have, for instance, a generally circular and/or tubular shape.

Referring to FIG. 2, in one example of adjustable spacer 110, a distance 224 of second end 204 from axis 216, may be different from and/or less than a distance 222 of first end 202 from the axis 216. In addition, dimensions of the adjustable spacer 110, for instance, radial dimension 226, axial dimension 228, and/or axial distance 229 (e.g., between first end 202 and a transition 223 of exterior portion 219 of the adjustable spacer, the transition 223 being from convex portion 220 to concave portion 218), may vary, for example, owing to a desired adjustment made to deformable portion 140. The adjustable spacer 110 may be formed with a material such as steel. A number of geometric features of the adjustable spacer may be provided, for instance, by casting and/or machining.

A description of illustrative support and/or structure of one example of adjustable spacer 110 in bearing assembly 100 is now presented. Referring to FIGS. 1–3, bearing 102 may be inserted and assembled so outer race 114 abuts shoulder 132 of housing 108, and shoulder 128 of spindle 106 abuts inner race 112. The adjustable spacer 110 may be inserted, slid, and/or located so first end 202 generally axially abuts and/or engages shoulder 130 of the spindle 106, and second end 204 of the adjustable spacer 110 radially abuts and/or engages surface 138 of the spindle. In one example, the adjustable spacer 110 may have a desired adjustment provided to deformable portion 140 before direct and/or final assembly of the adjustable spacer in the bearing assembly 100. In another example, such a desired adjustment to the deformable portion 140 may occur during direct and/or final installation of the adjustable spacer in the bearing assembly, as described below.

Advantageously, in a further example, curved part 144 of inner race 122 of bearing 104 may be inserted onto and/or fit with curved portion 142 of adjustable spacer 110. In one aspect, the curved portion 142 of the adjustable spacer may accommodate the curved part 144 of the inner race 122 by matching a curved extent and/or expanse comprising the curved part 144 of the bearing 104. In another aspect, the curved portion 142 may enhance interfacing between the adjustable spacer 110 and the inner race 122 of the bearing 104, such as by increasing an area, patch, and/or region 236 of engagement, abutment, and/or interfacing therebetween. For instance, the region 236 of engagement between the curved portion 142 and the curved part 144 may improve and/or enhance transfer of force between the inner race 122 of the bearing 104, and the adjustable spacer 110. Further, the region 236 of engagement between the curved portion 142 and the curved part 144 may decrease fatigue and/or increase operational life of the adjustable spacer 110 and/or bearing 104, such as by widening and/or expanding a distribution of force transmitted between the adjustable spacer 110 and the inner race 122. That is, the region 236 of engagement between the curved portion 142 and the curved part 144 may desirably counteract and/or decrease harmful and/or deleterious effects, which often increase with point contact or reduced mating areas between supporting, structural, and/or forcibly engaged surfaces.

In yet another aspect, adjustable spacer 110 may enhance structural support and/or force transfer in bearing assembly 100, such as by supporting region 236 of interfacing between curved portion 142 and curved part 144, with medial portion 206 that may include outwardly convex portion 220 and inwardly concave portion 232, and which may terminate in terminal face portion 203 of the adjustable spacer. In particular, the adjustable spacer 110 may desirably increase and/or maximize use of arcuate and/or curved geometries, and/or decrease and/or minimize use of complicated and/or difficult surfaces, such as for efficient and/or effective force transmission and/or material preservation and/or longevity. For instance, the curved portion 142 of the adjustable spacer 110 may radially and/or axially support the curved part 144 of bearing 104.

An exemplary structural implementation for promoting and/or enhancing effective force transmission may be provided by exterior portion 219 of adjustable spacer 110 having transition 223 comprise a relatively smooth transition between concave portion 218 for curved portion 142, and convex portion 220 for deformable portion 140. Such a smoothness and/or continuity for curve 221 of exterior portion 219 of the adjustable spacer 110 may comprise, form, and/or contribute to formation of an overall bend and/or curvature for a (e.g., sectional) profile of the adjustable spacer 110, with the profile including concave portion 232 of inward face portion 230 of the adjustable spacer.

The illustrative description of exemplary support and/or structure of one example of adjustable spacer 110 in bearing assembly 100 continues. Bearing 104 may be assembled and/or inserted against and/or adjacent the adjustable spacer 110. For example, outer race 124 of the bearing 104 may be received by shoulder 134 of retainer 154. The retainer 154 may be located between the outer race 124 and housing 108.

As mentioned above, adjustable spacer 110 may have a desired adjustment provided to the deformable portion 140 before direct and/or final assembly of the adjustable spacer in bearing assembly 100. In another example, the deformable portion 140 may be provided with a desired adjustment during direct and/or final installation of the adjustable spacer 110 in the bearing assembly.

For instance, with adjustable spacer 110 generally axially abutting shoulder 130 of spindle 106, inner race 122 of bearing 104 may be located so curved part 144 meets curved portion 142. Furthermore, outer race 124 may be secured and/or received in the retainer 154, for example, before mounting about the spindle 106. Next, in a further example, the retainer 154 and the outer race 124 may be inserted between the spindle 106 and the housing 108 to assemble the bearing 104.

Furthermore, bearing assembly 100 may be configured so axial movement of retainer 154 toward adjustable spacer 110 transmits force through outer race 124, roller elements 126, and inner race 122 to the adjustable spacer 110, through region 236 of interfacing between curved part 144 and curved portion 142, to cause a compression of the deformable portion 140. The transmission of force at a certain level appropriate for compressing the deformable portion 140 of the adjustable spacer 110, may be halted by and/or ceased upon first end 202 of the adjustable spacer abutting shoulder 130 of spindle 106, with shoulder 128 of the spindle 106 relatively firmly abutting bearing 102 held by housing 108. For instance, stop 136 of the retainer 154 may be located axially along the retainer 154 such that the transmission of force to provide the desired adjustment to the deformable portion 140 of the adjustable spacer 110, halts and/or ceases advancement and/or continuation when the stop 136 abuts the housing 108. Following the compression to provide the desired adjustment to the deformable portion 140 of the adjustable spacer, the axial compression may be relaxed and/or removed so gap 160 exists between the stop 136 and the housing 108 during idling and/or operation of the bearing assembly 100, as will be appreciated by those skilled in the art.

In a further example, deformable portion 140 of adjustable spacer 110 may be formed such that the spacer can be compressed axially and react with a (e.g., generally) constant force as described in U.S. Pat. No. 4,067,585 to John E. Rode (entitled "Deformable Metallic Element," issued Jan. 10, 1978, and assigned to Temper Corporation), which is hereby incorporated herein by reference in its entirety. As will be appreciated by those skilled in the art, such an adjustable spacer 110 may provide an additional advantage that permits accurate axial adjustment of bearing clearance without requiring specific measurements of component dimensions.

In one embodiment, referring to FIG. 1, the deformable portion 140 may be configured such that adjustable spacer 110 may be adjusted by a (e.g., generally) constant compressing force applied to retainer 154, with the "spring back" observed as gap 160 being a (e.g., generally) constant value dependent upon the resilience of the bearings 102, 104 from release of the (e.g., generally) constant force used to compress the spacer. For instance, a gasket or shim (not shown) may be positioned in the space between housing 108 and stop (e.g., retainer abutment) 136, with the gasket or shim having a thickness such as 0.002 inch greater than the gap 160, so that the bearings 102, 104 may be assembled with an established running clearance or end play (e.g., generally) equal to the 0.002 inch. In this way, a relatively or extremely accurate setting of the bearings 102, 104 may be achieved without any specific measurements of each component, providing an advantage for, for example, mass-produced bearing assemblies 100.

While parts of the description herein, for explanatory purposes, may imply certain exemplary directions, such directions may be considered relative. As will be appreciated by those skilled in the art, the significance of, for example, a "vertically upward" direction in many environments may stem from its opposition to a dominant "downwardly" acting gravitational force, resulting from the presence of a large mass such as the Earth, with "vertical" approximating radial alignment therewith. Furthermore, a "horizontal" direction and a "vertically upward" direction may be readily ascertained following determination of an appropriate "downward" direction. A number of design choices may allow accommodations of any orientations for any spacers, assemblies, devices, and/or systems of the present invention.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A bearing assembly adjustable spacer, comprising:
   a ring shaped member being configured to contact the surface of one of an axle, shaft or spindle;
   a first section of said member including a deformable portion, said deformable portion allowing said spacer to be provided with a desired adjustment; and
   a second section of said member including a transversely inward face portion and a transversely outward face portion, said inward face portion generally directed radially relative to an axis of said spacer, said outward face portion having a generally axially curved portion largely directed obliquely away from said first section, said curved portion configured to interface with a generally axially curved part of a bearing.

2. The spacer of claim 1, wherein said curved portion includes a concave portion.

3. The spacer of claim 1, wherein said end portion, said deformable portion, and said curved portion form an exterior portion of said spacer, said exterior portion comprising a substantially continuous, generally axial curve including a concave portion and a convex portion.

4. The spacer of claim 1, wherein said deformable portion forms an exterior portion of said spacer, said exterior portion being convex.

5. The spacer of claim 1, wherein said end portion is located a first distance from said axis, wherein said inward face portion is located a second distance from said axis, said second distance being different from said first distance.

6. The spacer of claim 5, wherein said second distance is less than said first distance.

7. The spacer of claim 1, wherein said end portion includes a terminal face portion directed generally axially away from said second section.

8. The spacer of claim 1, wherein said inward face portion resembles an arc.

9. The spacer of claim 1, wherein said curved portion is curved generally radially.

10. The spacer of claim 1, wherein said desired adjustment includes at least one of a preload, an adjustment to an axial dimension of said spacer, and a compression of said deformable portion.

11. A bearing assembly ring-shaped adjustable spacer, comprising:
    a first end portion configured for generally axial abutment at a first location about a spindle portion;
    a second end portion configured for generally radial abutment at a second location about a spindle portion; and
    a medial portion located between said first end portion and said second end portion, said medial portion including a deformable portion and a generally axially curved portion, said deformable portion allowing said spacer to be provided with a desired adjustment, said curved portion configured to interface with a generally axially curved part of a bearing.

12. The spacer of claim 11, wherein said curved portion includes a transversely outward face portion, said outward face portion including a concave portion.

13. The spacer of claim 11, wherein said curved portion includes a transversely outward face portion, said outward face portion largely directed away from said first end portion.

14. The spacer of claim 11, wherein said first end portion, said deformable portion, and said curved portion form an exterior portion of said spacer, said exterior portion comprising a substantially continuous, generally axial curve including a concave portion and a convex portion.

15. The spacer of claim 11, wherein said deformable portion includes a transversely outward face portion, said outward face portion being convex.

16. The spacer of claim 11, wherein said medial portion includes a transversely inward face portion, said inward face portion being concave.

17. The spacer of claim 11, wherein said first end portion is located a first distance from an axis of said spacer, wherein said second end portion is located a second distance from said axis, said second distance being different from said first distance.

18. The spacer of claim 17, wherein said second distance is less than said first distance.

19. The spacer of claim 11, wherein said desired adjustment includes at least one of a preload, an adjustment to an axial dimension of said spacer, and a compression of said deformable portion.

20. A method for configuring a bearing assembly adjustable spacer, said method comprising:
   curving generally axially a face portion of said spacer to interface with a generally axially curved part of a bearing; and
   forming a deformable portion of said spacer to allow said spacer to be provided with a desired adjustment.

21. An adjustable bearing assembly, comprising:
   a shoulder portion of a spindle;
   a bearing portion located about said spindle, said bearing portion including a generally axially curved part; and
   an adjustable ring shaped spacer located about said spindle between said shoulder portion and said curved part, said adjustable spacer including an end portion interfacing with said shoulder portion, a generally axially curved portion interfacing with said curved part, and a deformable portion allowing said spacer to be provided with a desired adjustment.

22. The assembly of claim 21, wherein said curved portion at least one of radially and axially supports said curved part.

23. The assembly of claim 21, wherein said end portion generally axially abuts said shoulder portion.

24. The assembly of claim 21, wherein said end portion comprises a first end portion, and further comprising a surface portion of said spindle, wherein said adjustable spacer includes a second end portion interfacing with said surface portion, wherein said curved portion is located between said first end portion and said second end portion.

25. The assembly of claim 24, wherein said second end portion generally radially abuts said surface portion.

26. The assembly of claim 24, wherein said first end portion is located a first distance from an axis of said spacer, wherein said second end portion is located a second distance from said axis, and wherein said second distance is different from said first distance.

27. The assembly of claim 26, wherein said second distance is less than said first distance.

28. The assembly of claim 21, wherein said bearing portion comprises a race of a roller bearing.

29. The assembly of claim 21, wherein said bearing portion rotatably supports a housing portion located about said spindle.

30. The assembly of claim 29, wherein a retainer portion is located between said bearing portion and said housing portion.

31. The assembly of claim 29, wherein said bearing portion comprises a first bearing portion, and further comprising a second bearing portion located between said shoulder portion and said housing portion.

32. The assembly of claim 31, wherein said shoulder portion comprises a first shoulder portion, and further comprising a second shoulder portion of said spindle located between said first shoulder portion and said housing portion, said second bearing portion interfacing with said second shoulder portion.

33. The assembly of claim 21, wherein said desired adjustment includes at least one of a preload, an adjustment to an axial dimension of said spacer, and a compression of said deformable portion.

* * * * *